United States Patent [19]

Matsumoto et al.

[11] Patent Number: 4,614,932
[45] Date of Patent: Sep. 30, 1986

[54] ALARM SYSTEM FOR THE UNEXPECTED RELEASE OF A BRAKE IN A VEHICLE

[75] Inventors: Muneaki Matsumoto; Sukeyasu Kanno, both of Okazaki, Japan

[73] Assignee: Nippon Soken, Inc., Nishio, Japan

[21] Appl. No.: 551,690

[22] Filed: Nov. 14, 1983

[30] Foreign Application Priority Data

Nov. 17, 1982 [JP] Japan ............................ 57-202508
Dec. 26, 1982 [JP] Japan ............................ 57-228566

[51] Int. Cl.⁴ .................... B60Q 1/00; B60Q 1/44
[52] U.S. Cl. ............................ 340/52 B; 180/272; 200/61.87; 200/61.89; 340/62; 340/69
[58] Field of Search ............ 340/52 B, 69, 62, 936, 340/670; 364/424; 188/1.11; 200/61.87, 61.89; 307/10 R; 180/271–272, 282

[56] References Cited

U.S. PATENT DOCUMENTS

| | | | |
|---|---|---|---|
| 2,446,276 | 8/1948 | Good | 340/69 |
| 2,584,938 | 2/1952 | Sweeny et al. | 340/69 |
| 2,788,514 | 4/1957 | Schmitt | 340/69 X |
| 3,462,571 | 8/1969 | Edwards | 200/61.89 |
| 3,702,459 | 11/1972 | Bauchan | 340/62 |
| 3,710,315 | 1/1973 | Scherenberg | 340/62 |
| 3,774,152 | 11/1973 | Tandy | 340/62 |
| 3,790,932 | 2/1974 | Ridpath | 340/62 |
| 4,143,352 | 3/1979 | Jarmotz | 340/62 X |

FOREIGN PATENT DOCUMENTS

| | | | |
|---|---|---|---|
| 2005714 | 9/1971 | Fed. Rep. of Germany | 340/69 |
| 154344 | 5/1981 | Japan | 340/52 B |
| 15057 | 1/1982 | Japan | 340/52 B |
| 99451 | 3/1982 | Japan | 340/52 B |
| 1213964 | 11/1970 | United Kingdom | 340/69 |

Primary Examiner—Glen R. Swann, III
Assistant Examiner—Thomas J. Mullen, Jr.
Attorney, Agent, or Firm—Cushman, Darby & Cushman

[57] ABSTRACT

In an alarm system for the unexpected release of a foot brake or a hand brake in a vehicle, when the brake is put on, an alarm is generated in response to the speed of the vehicle.

3 Claims, 20 Drawing Figures

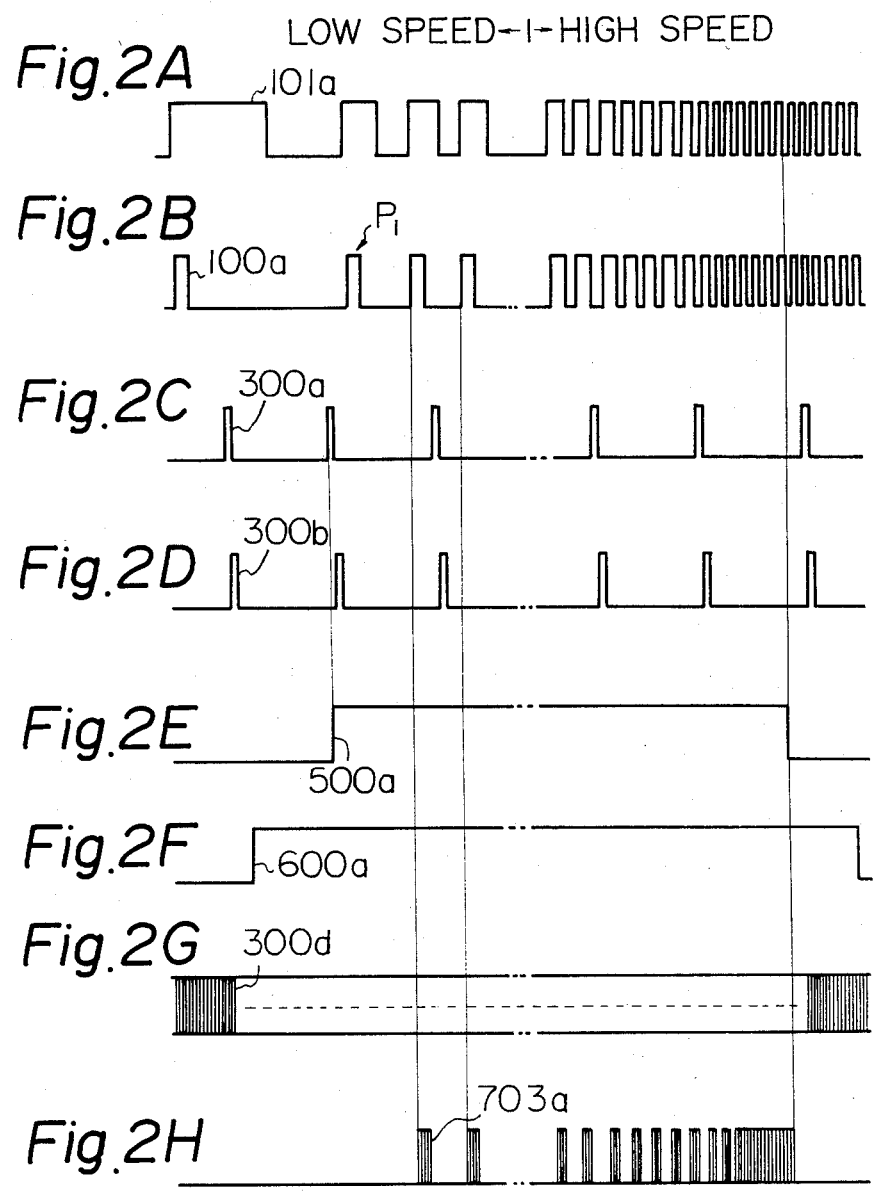

LOW SPEED ← | → HIGH SPEED

ALARM SYSTEM FOR THE UNEXPECTED RELEASE OF A BRAKE IN A VEHICLE

BACKGROUND OF THE INVENTION

1. Field of the Invention

The present invention relates to an alarm system for the unexpected release of a foot brake or a hand brake in a vehicle.

2. Description of the Prior Art

In a vehicle, even though the foot brake switch is turned on or the hand brake switch is turned on so as to indicate the stopped state of the vehicle, the vehicle moves if it is stopped on a slope or if it has an automatic transmission.

SUMMARY OF THE INVENTION

It is an object of the present invention to provide an alarm system for the unexpected release of the foot brake or the hand brake in a vehicle.

According to the present invention, when a vehicle moves in spite of the brake switch being turned on an alarm is generated in response to the speed of the vehicle.

BRIEF DESCRIPTION OF THE DRAWINGS

The present invention will be more clearly understood from the description as set forth below with reference to the accompanying drawings.

FIGS. 2A through 2H are wave form diagrams of the signals appearing in the circuits of FIGS. 1A and 1B.

DESCRIPTION OF THE PREFERRED EMBODIMENTS

Figure 1A:
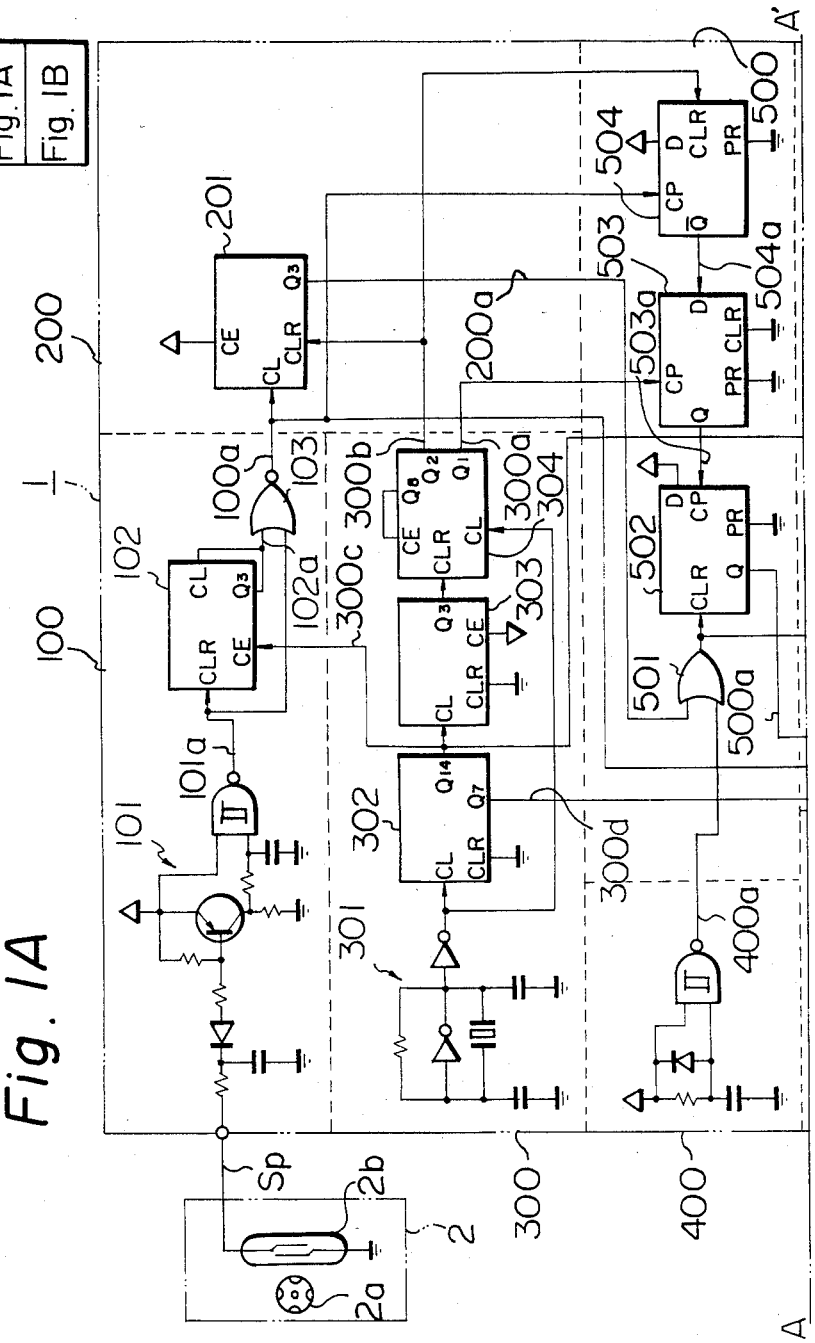
FIGS. 1A and 1B are circuit diagrams illustrating an embodiment of the alarm system for the unexpected release of a brake in a vehicle according to the present invention.
Figure 1B:
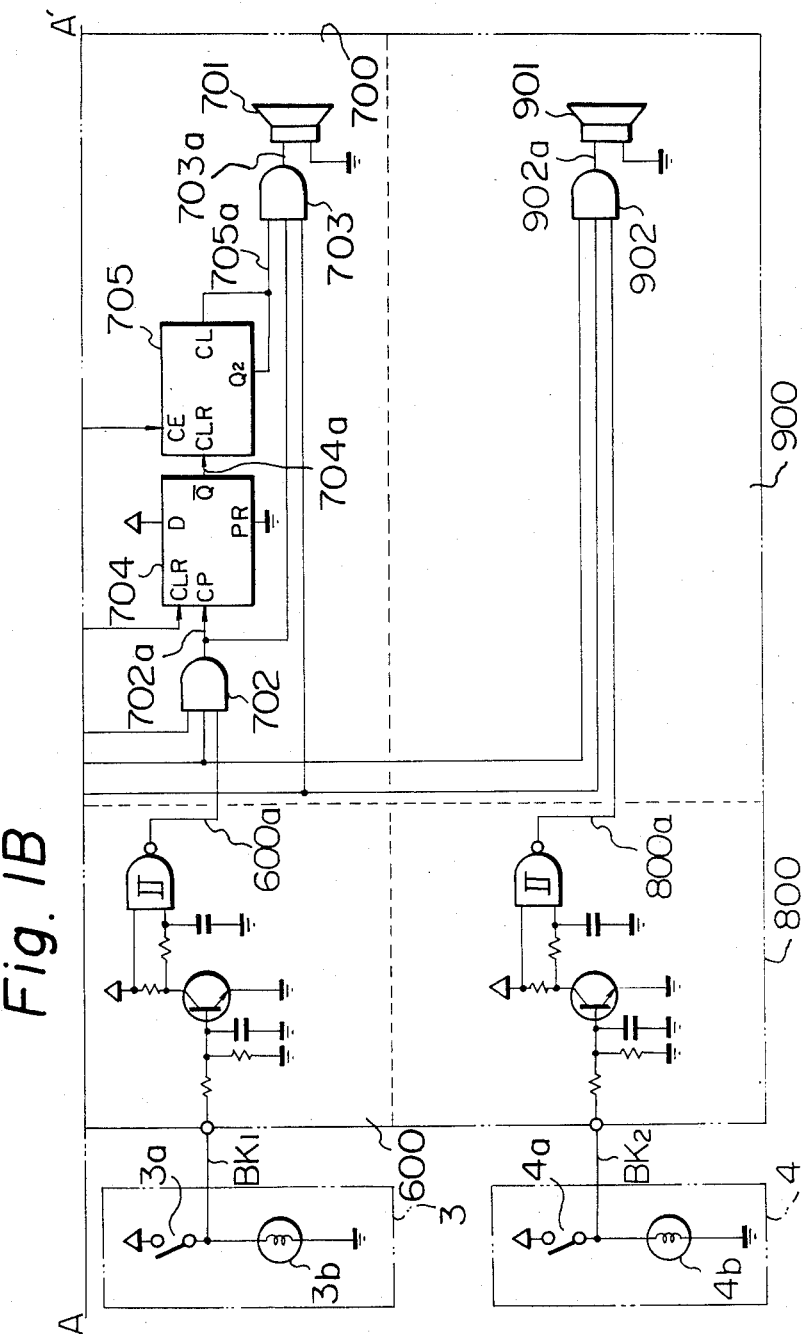

In FIGS. 1A and 1B, which illustrate an embodiment of the present invention, reference numeral 1 designates an alarm device for sounding an alarm for the unexpected release of a brake, 2 a vehicle speed sensor for detecting the speed of a vehicle, 3 a detecting circuit for detecting whether or not the foot brake (not shown) is on, and 4 a detecting circuit for detecting whether or not the hand brake (not shown) is on.

Figure 3:
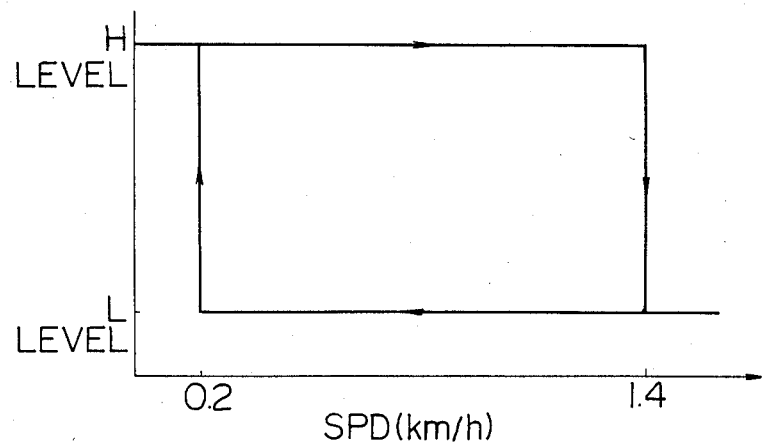
FIG. 3 is a diagram illustrating the characteristic of the signal 500a of FIGS. 1A and 1B.

The alarm device 1 comprises a vehicle speed wave-shaping circuit 100—formed by a wave-shaping circuit 101, a mono-multivibrator (one-shot circuit) 102, and an NOR circuit 103, a vehicle speed-detecting circuit 200 for detecting whether or not the vehicle speed SPD is greater than a predetermined value such as 1.4 km/h, a timing clock-generating circuit 300, a power-on reset circuit 400 for generating a reset signal 400a when the ignition switch (not shown) is turned on, a vehicle speed-detecting circuit 500 for generating a vehicle speed-detecting signal 500a as is shown in FIG. 3, a wave-shaping circuit 600 for shaping the output wave form of the detecting circuit 3 for the foot brake, a first alarm circuit 700 for generating an alarm via the wave-shaping circuit 600 in response to the detecting circuit 3 for the foot brake, a wave-shaping circuit 800 for shaping the output wave form of the detecting circuit 4 for the hand brake, and a second alarm circuit 900.

The vehicle speed sensor 2 is comprised of a rotating permanent magnet 2a, connected to the speedometer cable (not shown), and a lead switch 2b. When the permanent magnet 2a is rotated by the speedometer, the lead switch 2b is switched on and off so as to generate a pulse-shaped vehicle speed signal Sp having a frequency in proportion to the vehicle speed SPD.

The detecting circuit 3 is comprised of a foot brake switch 3a and a brake lamp 3b. When the foot brake is operated so as to turn on the switch 3a, the detecting circuit 3 generates a high-potential brake signal $BK_1$. Similarly, the detecting circuit 4 is comprised of a hand brake switch 4a and a brake lamp 4b. When the hand brake is operated so as to turn on the switch 4a, the detecting circuit 4 generates a high-potential brake signal $BK_2$.

The alarm device 1 is explained in more detail with reference to FIGS. 2A through 2H, 3, and 4A through 4E.

The wave-shaping circuit 101 shapes the output wave form of the vehicle speed signal Sp so as to generate a rectangular wave signal 101a as is illustrated in FIG. 2A. The one-shot circuit 102 is triggered by the rise edge of the signal 101a so as to generate a signal 102a from the output terminal Q3 thereof. Both of the signals 101a and 102a are supplied to the NOR circuit 103, which generates a signal 100a as is illustrated in FIG. 2B.

The vehicle speed-detecting circuit 200 is comprised of a binary up counter 201 such as a TC4520BP. The counter 201 is counted up by the output pulses of the signal 100a and is cleared by a reset signal 300b having a frequency of 1.83 Hz as is illustrated in FIG. 2C. As a result, the counter 201 generates a high-potential reset signal 200a from the output Q3 thereof when the vehicle speed SPD is greater than 1.4 km/h.

Figure 4A:
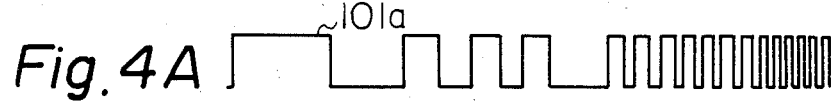
FIGS. 4A through 4E are wave form diagrams of the signals appearing in the circuits of FIGS. 1A and 1B.
Figure 4B:
Figure 4C:
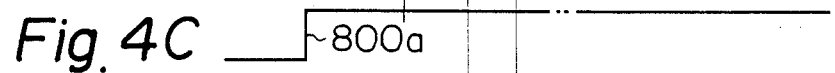
Figure 4D:
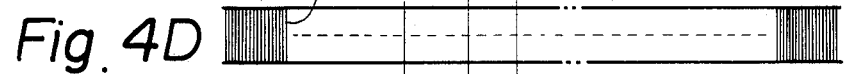

The timing clock-generating circuit 300 comprises a crystal oscillating circuit 301 and a frequency divider circuit formed by a counter 302 such as a TC4020BP, a counter 303 such as a TC4020BP, and a counter 304 such as a TC4017BP. The crystal oscillating circuit 301 generates a reference timing signal having a frequency of 480 kHz. The counter 302 generates a timing signal 300d having a frequency of 3.75 kHz ($=480$ kHz/$2^7$) from the output terminal Q7 thereof, as is illustrated in FIG. 2G or FIG. 4D, and supplies it to the alarm circuits 700 and 900. In addition, the counter 302 generates a timing signal 300c having a frequency of 29.3 Hz ($=480$ kHz/$2^{14}$) from the output terminal Q14 thereof and supplies it to the one-shot circuit 102 and to the alarm circuit 700. The counter 304 generates a high-potential set signal 300a from the output terminal Q1 thereof, as is illustrated in FIG. 2C, and, in addition, generates a high-potential reset signal 300b from the output terminal Q2 thereof, as is illustrated in FIG. 2D. Both of the signals 300a and 300b, having a frequency of 1.83 Hz, are generated at every fall edge of the output of the counter 304.

When the power-on reset circuit 400 receives a power supply from a power line via the turned-on ignition switch, the power-on reset circuit 400 generates a power-on reset signal 400a having a predetermined duration.

The vehicle speed-detecting circuit 500 comprises an OR circuit 501 and three flip-flops 502, 503, and 504 such as a TC4013BP. The flip-flop 504 generates a low-potential signal 504a from the output terminal $\overline{Q}$ thereof from the time when the signal 100a falls to the time when the reset signal 300b falls. The flip-flop 503 responds to the signal 504a of the flip-flop 504 when the set signal 300a rises. As a result, the flip-flop 503 generates a high-potential signal 503a from the output terminal Q thereof. If no signal 100a is generated during the time period (=0.546 s) of the set signal 300a, i.e., if the vehicle speed SPD is less than 0.2 km/h, the signal 503a has a high potential. The flip-flop 502 responds to the rise edge of the signal 503a of the flip-flop 503 so as to generate the vehicle speed-detecting signal 500a, as is illustrated in FIG. 3, from the output terminal Q thereof. That is, when the vehicle speed SPD is less than 0.2 km/h, the vehicle speed-detecting signal 500a has a high potential. In addition, in a standby state where the power-on reset signal 400a has a high potential for a predetermined time period such as about 0.14 s or in a state where the vehicle speed SPD is greater than 1.4 km/h so that the signal 200a has a high potential, the output of the OR circuit 501 becomes high so that the output terminal Q of the flip-flop 502 becomes high. Note that the signal 500a has a hysteresis characteristic. That is, after the vehicle speed SPD becomes less than 0.2 km/h, the signal 500a remains at a high potential until the vehicle speed SPD becomes 1.4 km/h. Contrary to this, after the vehicle speed SPD becomes more than 1.4 km/h, the signal 500a remains at a low potential until the vehicle speed SPD becomes 0.2 km/h. In this case, assume that the signal 500a changes as is illustrated in FIG. 2E.

The wave-shaping circuit 600 responds to the brake signal BK$_1$ of the detecting circuit 3 for the foot brake. As a result, the wave-shaping circuit 600 generates a high-potential signal 600a as is illustrated in FIG. 2F.

The first alarm circuit 700 comprises a piezoelectric buzzer 701, AND circuits 702 and 703, a flip-flop 704 such as a TC4013BP, and a counter 705 such as a TC4520BP. The AND circuit 702 responds to each high potential of the signal 100a of FIG. 2B, the vehicle speed-detecting signal 500a, of FIG. 2E, and the signal 600a of FIG. 2F so as to generate a high-potential signal 702a. The flip-flop 704 responds to the rise edge of the signal 702a and the high potential of the power-on reset signal 400a or the reset signal 200a so as to generate a signal 704a from the output terminal $\overline{Q}$ thereof. In this case, the signal 704a falls due to the rise edge of the signal 702a, and it remains at a high potential when the potential of the power-on reset signal 400a or the reset signal 200a is high. The counter 705 responds to the timing signal 300c and the fall edge of the signal 704a so as to generate a high-potential signal 705a after a predetermined delay time of, for example, about 0.14 s. This delay time delays the operation of the first alarm circuit 700 only when the vehicle is allowed to move by conventionally operating the foot brake. The AND circuit 700 responds to each high potential of the timing signal 300d, the signal 702a, and the signal 705a so as to generate a high-potential alarm signal 703a as is illustrated in FIG. 2H. The high-potential alarm signal 703a energizes the buzzer 701. Thus, the period of the alarm signal 703a is equal to that of the vehicle speed signal 100a. Accordingly, the shorter this period, the greater the vehicle speed SPD. Note that after the vehicle speed SPD becomes less than 0.2 km/h so that the potential of the vehicle speed-detecting signal 500a becomes high, no alarm signal 703a is generated for a predetermined time period which corresponds to the above-mentioned delay time. For example, no alarm signal 703a is generated for the first pulse P$_1$ of the vehicle speed signal 100a (See FIG. 2B).

The wave-shaping circuit 800 responds to the brake signal BK$_2$ of the detecting circuit 4 for the hand brake. As a result, the wave-shaping circuit 800 generates a high-potential signal 800a as is illustrated in FIG. 4C.

Figure 4E:
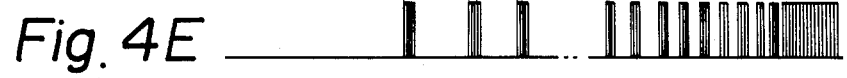

The secord alarm circuit 900 comprises a piezoelectric buzzer 901 and an AND circuit 902. The AND circuit 902 responds to each high potential of the timing signal 300d, the signal 100a, and the signal 800a so as to generate a high-potential alarm signal 902a as is illustrated in FIG. 4E. The high-potential alarm signal 902a energizes the buzzer 901. Thus, the period of the alarm signal 902a is equal to that of the vehicle speed signal 100a. Accordingly, the shorter this period, the greater the vehicle speed SPD.

Figure 5:
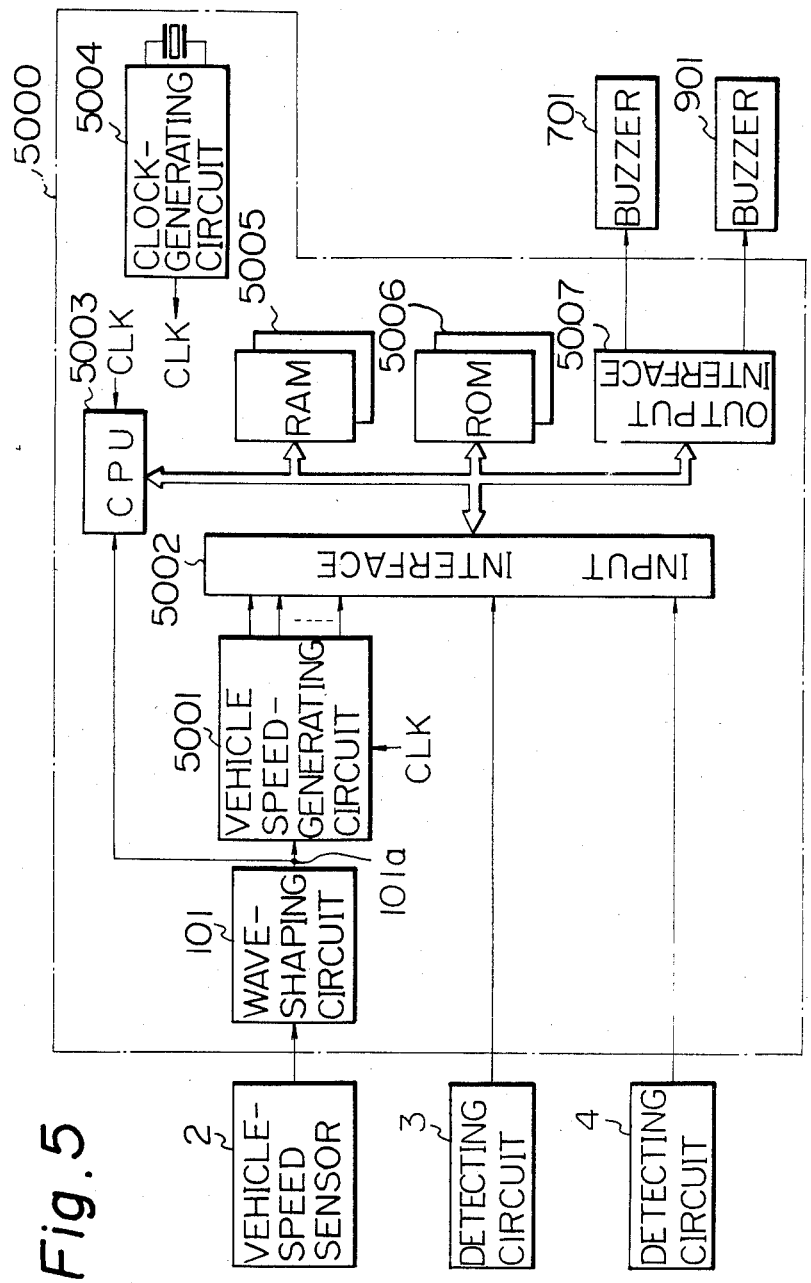
FIG. 5 is a block circuit diagram illustrating another embodiment of the alarm system for the unexpected release of a brake in a vehicle according to the present invention.

In FIG. 5, which illustrates another embodiment of the present invention, a microcomputer 5000 is used instead of the logic circuit of FIG. 1. That is, the analog output signal of the vehicle speed sensor 2 is supplied via the wave-shaping circuit 101 and a vehicle speed-generating circuit 5001 to predetermined positions of the input interface 5002. The wave-shaping circuit 101 converts the output signal of the vehicle-speed sensor 2 into a rectangular wave signal 101a which is transmitted to the vehicle speed-generating circuit 5001. The vehicle speed-generating circuit 5001 is comprised, for example, of a flip-flop, a gate, and a counter. That is, the flip-flop is set and reset alternately by the rectangular wave signal of the wave-shaping circuit 101 so that the gate is open only when the flip-flop is being set or reset. The counter counts the number of pulses of the clock signal CLK of a clock-generating circuit 5004 via the open gate. Therefore, the counter generates a binary code signal which has a value inversely proportional to the frequency of the rectangular wave signal, i.e., to the vehicle speed SPD. The digital output signal from the detecting circuits 3 and 4 is supplied directly to predetermined positions of the input interface 5002. Reference numeral 5003 designates a central processing unit (CPU), 5005 a random-access memory (RAM) for storing temporary data or the like, and 5006 a read-only memory (ROM) for storing programs such as the flow-chart of FIG. 6. The CPU 5003 energizes the alarm buzzers 701 and 901 via an output interface 5007.

The operation of the microcomputer of FIG. 5 is explained with reference to FIG. 6.

Figure 6:
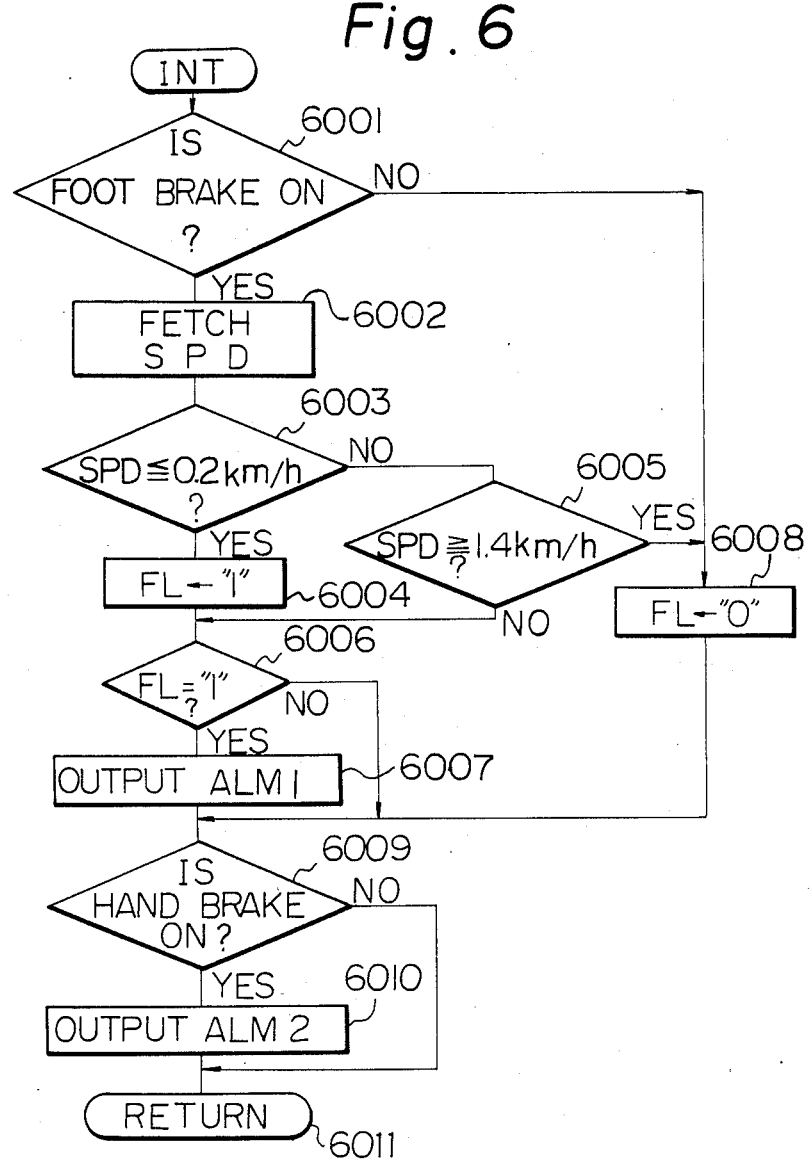
FIG. 6 is a flow chart illustrating the operation of the circuit of FIG. 5.

FIG. 6 is a flow chart of an interrupt routine carried out at every rise edge of the vehicle speed signal 100a of the wave-shaping circuit 100. At step 6001, the CPU 5003 determines whether or not the foot brake is on. If it is on, control is transferred to step 6002, in which the CPU 5003 fetches the vehicle speed SPD from the vehicle-speed generating circuit 5001. Then, at step 6003, the CPU 5003 determines whether or not SPD $\leq 0.2$ km/h, and at step 6005, the CPU 5003 determines whether or not SPD $\geq 1.4$ km/h.

If SPD $\leq 0.2$ km/h, control is transferred via step 6003 to step 6004, in which the CPU 5003 causes a flag FL to be the logic "1". Then control is transferred to step 6006.

If 0.2 km/h<SPD<1.4 km/h, control is transferred via steps 6003 and 6005 to step 6006.

If SPD ≧1.4 km/h, control is transferred via steps 6003 and 6005 to step 6008, in which the CPU 5003 clears the flag FL. In addition, if the determination at step 6001 is "NO", control is also transferred to step 6008.

Note that the flag FL is cleared by an initialization routine which is carried out when the ignition switch is turned on.

At step 6006, the CPU 5003 determines whether or not the flag FL is the logic "1". If it is the logic "1", control is transferred to step 6007, in which the CPU 5003 outputs an alarm signal ALM1 at a predetermined position of the output interface 5007 so as to energize the buzzer 701. Contrary to this, if the determination at step 6006 is "NO", control is transferred to step 6009.

Note that steps 6001 through 6008 correspond to the operation for the foot brake, and steps 6009 through 6011 correspond to the operation for the hand brake.

At step 6009, the CPU 5003 determines whether or not the hand brake switch 4a is turned ON. If it is ON, control is transferred to step 6010, in which the CPU 5003 outputs an alarm signal ALM2 at a predetermined position of the output interface 5007 so as to energize the buzzer 901. Then control is transferred to step 6011, thereby completing the routine of FIG. 6.

If the determination at step 6009 is "NO", control is transferred to step 6011.

Thus, the operation as is shown in FIG. 6 is the same as that of the logic circuit of FIG. 1.

Figure 7A:
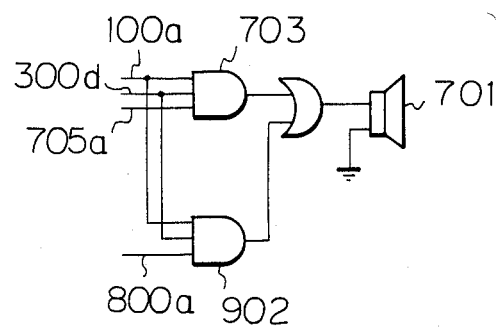
FIGS. 7A and 7B are circuit diagrams of modifications of FIGS. 1A and 1B.
Figure 7B:
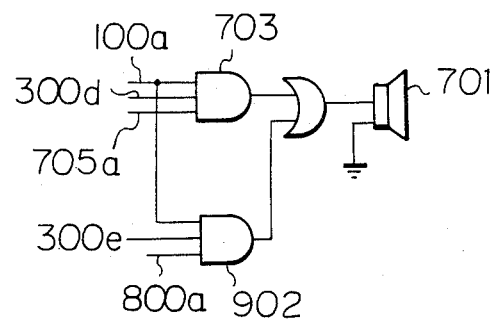

In the above-mentioned embodiments, light-emitting diodes can be used instead of the piezoelectric buzzers 701 and 901. In addition, the vehicle speed sensor 2 can be of a type which detects the speed relative to the earth by radar technology. Further, the buzzer 701 also can serve as the buzzer 901. For example, as illustrated in FIG. 7A, the buzzer 701 generates the same alarm both in the case of the foot brake and in the case of the hand brake, while, as illustrated in FIG. 7B, the buzzer 701 generates different alarms in response to the foot brake and the hand brake. Note that reference 300e of FIG. 7B designates the output signal of the output terminal ($Q_8$) of the counter 302.

We claim:

1. An alarm system for the insufficient braking effect by a foot brake associated with a brake switch in a vehicle, comprising:
    - means for detecting the state of the foot brake from the brake switch and for generating a brake signal when the brake switch is turned on;
    - means for detecting the speed of the vehicle and for generating a vehicle speed pulse signal having a frequency proportional to the speed of the vehicle;
    - means for detecting the stationary state of the vehicle, in accordance with the vehicle speed pulse signal, and for generating a vehicle stationary signal from the time when the speed of the vehicle becomes lower than a first value to the time when the speed of the vehicle becomes higher than a second value which is larger than the first value; and
    - means for generating an alarm in response to each pulse of the vehicle speed pulse signal, when said brake signal is generated by the foot brake state detecting means and said vehicle stationary signal is generated by the vehicle stationary state detecting means.

2. A system as set forth in claim 1, wherein said alarm generating means comprises means for prohibiting the generation of said alarm for a predetermined time period after the vehicle stationary state detecting means generates a first pulse of the vehicle speed pulse signal when the foot brake state detecting means generates said brake signal.

3. A system as set forth in claim 1, wherein the vehicle stationary state detecting means comprises:
    - a first means for determining whether the speed of the vehicle is lower than the first value;
    - a second means for determining whether the speed of the vehicle is higher than the second value; and
    - means for generating said vehicle stationary signal from the time when the determination of the first means determines that the vehicle speed is lower than the first value to the time when the determination of the second means determines that the vehicle speed is higher than the second value.

* * * * *